United States Patent
Colombo et al.

(10) Patent No.: US 11,021,206 B2
(45) Date of Patent: Jun. 1, 2021

(54) ACTUATOR DEVICE FOR A HYDRAULIC ACTUATION SYSTEM OF A BRAKE/CLUTCH OF A MOTORCYCLE, WITH SEPARATE ADJUSTMENT OF THE DISTANCE AND PITCH OF THE ACTUATION LEVER

(71) Applicant: FRENI BREMBO S.P.A., Curno (IT)

(72) Inventors: Marcello Colombo, Curno (IT); Roberto Lavezzi, Curno (IT)

(73) Assignee: Freni Brembo S.p.A., Bergamo (IT)

( * ) Notice: Subject to any disclaimer, the term of this patent is extended or adjusted under 35 U.S.C. 154(b) by 0 days.

(21) Appl. No.: 16/648,384

(22) PCT Filed: Sep. 26, 2018

(86) PCT No.: PCT/IB2018/057432
§ 371 (c)(1),
(2) Date: Mar. 18, 2020

(87) PCT Pub. No.: WO2019/064190
PCT Pub. Date: Apr. 4, 2019

(65) Prior Publication Data
US 2020/0283088 A1 Sep. 10, 2020

(30) Foreign Application Priority Data
Sep. 26, 2017 (IT) .................. 102017000107310

(51) Int. Cl.
*B62K 23/02* (2006.01)
*B62L 3/02* (2006.01)
(Continued)

(52) U.S. Cl.
CPC .............. *B62K 23/06* (2013.01); *B60T 7/102* (2013.01); *B60T 11/18* (2013.01); *B62L 3/023* (2013.01)

(58) Field of Classification Search
CPC ........ B62K 11/14; B62K 23/02; B62K 23/06; B62L 3/02; B62L 3/023; B60T 7/102; B60T 11/18
See application file for complete search history.

(56) References Cited

U.S. PATENT DOCUMENTS 8,276,477 B2 * 10/2012 Lavezzi ................. B62K 23/06
74/502.2
8,322,248 B2 * 12/2012 Esposito ................ B62K 23/06
188/24.11
(Continued)

FOREIGN PATENT DOCUMENTS

EP       1831069 B1   7/2009
WO    2014/068518 A1   5/2014

OTHER PUBLICATIONS

European Patent Office, International Search Report with Written Opinion, issued in PCT/IB2018/057432, dated Dec. 3, 2018, 12 pages, European Patent Office, Rijswijk, Netherlands.

*Primary Examiner* — Adam D Rogers
(74) *Attorney, Agent, or Firm* — Marshall & Melhorn, LLC

(57) ABSTRACT

The actuator device for a hydraulic actuation system for a brake/clutch for a motorcycle is described. The actuator device may have a support structure associable with a handlebar of the motorcycle. The actuator device may also have an actuation assembly having a push rod operatively connectable to at least one braking device. The actuator device may also have an actuation lever connected to the support structure so as to be rotatable about an actuation axis, where the actuation lever is provided with a pusher adapted to interface with the push rod. The actuator device may also have an adjustment device adapted to modify both the angular position, in a rest condition, of the pusher and of the actuation lever with respect to the handlebar and to (Continued)

modify a pitch between the actuation axis of the actuation lever and a contact and thrust point of the pusher on the push rod.

19 Claims, 11 Drawing Sheets

(51) Int. Cl.
  *B60T 7/08* (2006.01)
  *B62K 23/06* (2006.01)
  *B60T 7/10* (2006.01)
  *B60T 11/18* (2006.01)

(56) References Cited

U.S. PATENT DOCUMENTS

| | | |
|---|---|---|
| 8,336,308 B2 | 12/2012 | Gherardi et al. |
| 9,815,440 B2 * | 11/2017 | Colombo ............... B60T 7/102 |
| 2007/0107995 A1 * | 5/2007 | Jen ......................... B62K 23/06 |
| | | 188/67 |

* cited by examiner

ACTUATOR DEVICE FOR A HYDRAULIC ACTUATION SYSTEM OF A BRAKE/CLUTCH OF A MOTORCYCLE, WITH SEPARATE ADJUSTMENT OF THE DISTANCE AND PITCH OF THE ACTUATION LEVER

FIELD OF APPLICATION

The present invention relates to an actuator device for a hydraulic actuation system of a brake/clutch of a motorcycle, with separate adjustment of the distance and pitch of the actuation lever.

BACKGROUND ART

In particular, the present invention relates to the field of actuator devices, for brakes and/or clutches of motorcycles.

In particular, on motorcycles, braking sensitivity and the clutch release position depends greatly on the type of road surface, which is linked, in turn, to environmental conditions, which may vary from tracks to roads, rain, snow, sand, mud, compact terrain or gravel, and so forth.

For this reason, solutions are widely used in the art which allow to obtain systems for adjusting the pitch between lever and handlebar, for both clutch lever and brake lever.

In this regard there are various solutions.

For example, there are solutions which allow to vary the pitch with an adjusting screw provided with an eccentric seat for housing the push rod of the floating element. Such a solution, which allows various adjustments, has the advantage of being simple, robust and reliable. However, such a device does not allow the separate and separate adjustment of the pitch and of the distance of the lever. Indeed, by rotating the eccentric seat of the push rod both the pitch and the distance of the lever from the handlebar are adjusted. Therefore, despite being reliable and simple, the solution does not allow the independence of the two mentioned adjustments.

It is also known to use a sleeve with an eccentric seat for the push rod; three possible pitch adjustments can thus be obtained for each distance of the lever from the handlebar. In this case, the devices for adjusting the distance and the pitch are actually separated, but given a large number of mechanical components and therefore a constructive complexity and a non-negligible cost.

Generally, in the known solutions, the adjustments of the distance and of the pitch are mutually distant and are positioned so that they are neither easy nor ergonomic. Furthermore, the independence of the two adjustments is not always ensured and, where they are allowed, require inconvenient operations and very complex and expensive mechanical solutions.

PRESENTATION OF THE INVENTION

The need is therefore increasingly felt to solve the drawbacks and limitations mentioned above with reference to the prior art.

In other words, the need is felt to be able to simultaneously:
release the function of adjusting the distance of the lever from the handlebar from the adjustment of the pitch of the lever itself,
integrate the adjustment of the distance of the lever and the adjustment of the pitch in a single device;
drastically reduce the number of components, weight and overall cost of the adjustment device.

These requirements are achieved by an actuator device for a hydraulic actuation system of a brake/clutch of a motorcycle in accordance with claim 1.

In particular, these requirements are achieved by an actuator device for a hydraulic actuation system of a brake/clutch of a motorcycle comprising:
a support structure associable with a handlebar of the motorcycle,
an actuation assembly having a push rod, operatively connected to at least one braking device,
an actuation lever rotationally connected to the support structure about an actuation axis in a first and a second direction towards and away from the associable handlebar, equipped with a pusher adapted to interface with said push rod,
adjustment means adapted to modify both the angular position, in a rest condition, of the pusher and of the lever with respect to the handlebar and to modify a pitch between the axis of the actuation lever and a contact and thrust point of the pusher on said push rod,
wherein the adjustment means comprise a bushing inserted in a counter-shaped cylindrical seat of the lever having a symmetry axis, so as to be able to at least rotate about said symmetry axis,
wherein the adjustment means comprise said pusher having a tang, inserted inside the bushing, and a bowl, integral with the tang, which interfaces with the push rod, said bowl being misaligned with respect the symmetry axis Y-Y by an eccentricity, so as to be able to vary the pitch by rotating the bowl about the symmetry axis,
wherein the pusher slides with respect to the lever parallel to said symmetry axis Y-Y,
wherein the translation and eccentric rotation movements of the pusher with respect to the symmetry axis Y-Y are mechanically and mutually independent.

According to a possible embodiment of the present invention, the bushing is fitted in the seat so as to be able to rotate and not translate with respect to the seat along the symmetry axis Y-Y.

According to a possible embodiment of the present invention, the pusher is inserted inside the bushing according to a screw-nut coupling with respect to an adjustment axis X-X placed parallel and eccentric with respect to the symmetry axis, according to said eccentricity.

According to a possible embodiment of the present invention, the tang of the pusher is offset by said eccentricity with respect to the symmetry axis Y-Y.

According to a possible embodiment of the present invention, the bushing comprises an outer collar to rotate it, so as to rotate the pusher eccentrically with respect to the symmetry axis Y-Y.

According to a possible embodiment of the present invention, tang is integrally connected to a knob for roto-translating it with respect to the bushing along the adjustment axis.

According to a possible embodiment of the present invention, a spring is interposed between the pusher and the lever, having at least one end fixed to the lever to adjust the rotation of the pusher in steps.

According to a possible embodiment of the present invention said spring also implements a step-lock for the rotation of the bushing, by means of at least one tooth which engages between the knob and a portion of a body or plate of the spring.

According to a possible embodiment, said spring and/or said knob are configured so as to provide at least one limit stop of the rotation of the pusher, so as to achieve a limit stop abutment between the spring and knob upon reaching a predetermined position of the adjustment of the pitch.

According to an embodiment, said spring and/or said knob are configured so as to provide two limit stops of the rotation of the pusher, in mutually opposite directions, so as to achieve a limit stop abutment between the spring and knob to reach two respective predefined maximum and minimum pitch positions.

According to an embodiment, said spring comprises a folded portion about an outer collar integral with the bushing, said folded portion obtaining at least one limit stop abutment against a corresponding shoulder formed on the knob.

According to an embodiment, the knob comprises an inner gripping portion which can rotate without interfering with said folded portion of the spring and at least one shoulder which protrudes from said inner gripping portion so as to interfere with the folded portion of the spring when reaching a limit stop.

According to a possible embodiment of the present invention, the bushing comprises an outer threaded surface which meshes with an adjustment screw, associated with the actuation lever, to allow the rotation the bushing.

According to a possible embodiment of the present invention, the meshing between the outer threaded surface of the bushing and the adjustment screw is of the irreversible type.

According to a possible embodiment of the present invention, a spring is interposed between the pusher and the lever or bushing, having at least one end fixed to the lever or bushing to adjust the rotation of the pusher in steps.

According to a possible embodiment of the present invention, the bushing is inserted in the cylindrical seat by means of a screw-nut type coupling centered according to the symmetry axis Y-Y so as to roto-translate parallel to said symmetry axis, wherein the pusher and the bushing are rotatably free and axially bound to each other with respect to said symmetry axis Y-Y.

According to a possible embodiment of the present invention, the tang of the pusher is coaxial with said symmetry axis Y-Y and the bowl has a centerline axis M-M off-center with respect to the symmetry axis Y-Y by said eccentricity E.

According to a possible embodiment of the present invention, tang is integrally connected to a knob for roto-translating it with respect to the bushing along the adjustment axis.

According to a possible embodiment of the present invention, a spring is interposed between the pusher and the lever, having at least one end fixed to the lever to adjust the rotation of the pusher in steps.

According to a possible embodiment of the present invention said spring also implements a step-lock for the rotation of the bushing, by means of at least one tooth which engages between the knob and a portion of a body or plate of the spring.

DESCRIPTION OF THE DRAWINGS

Further features and advantages of the present invention will become more apparent from the following description of preferred embodiments given by way of non-limiting examples, in which.

Elements or parts in common to the embodiments described below will be indicated using the same reference numerals.

DETAILED DESCRIPTION

Figure 1:
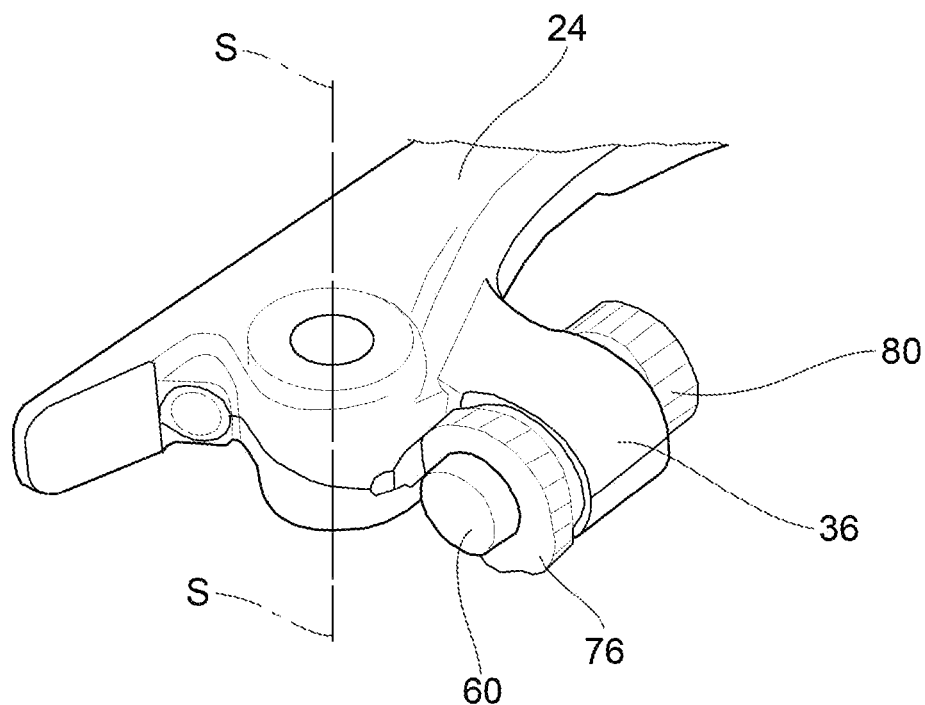
FIG. 1 is a perspective view, in assembled configuration, of an actuation lever of an actuator device according to a first embodiment of the present invention.
Figure 2:
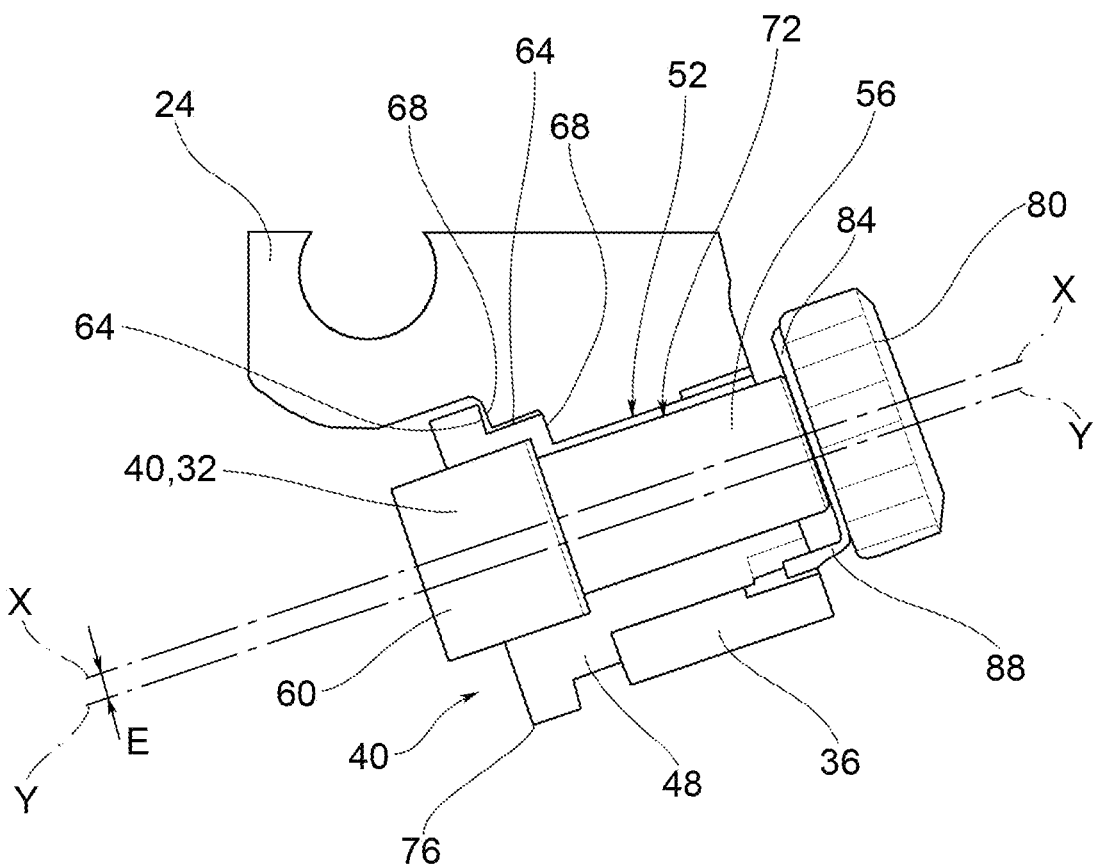
FIG. 2 is a perspective section view of the actuation lever of the actuator device in FIG. 1.
Figure 3:
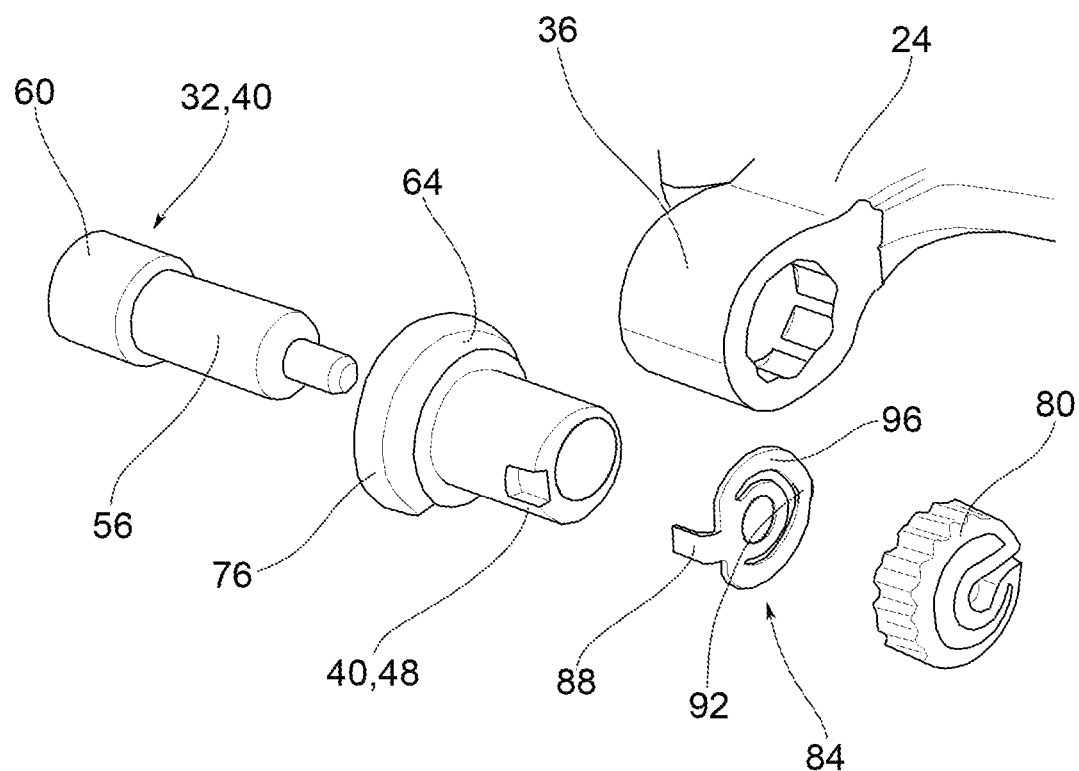
FIG. 3 is a perspective view, with parts separated, of the actuation lever in FIG. 1.
Figure 4:
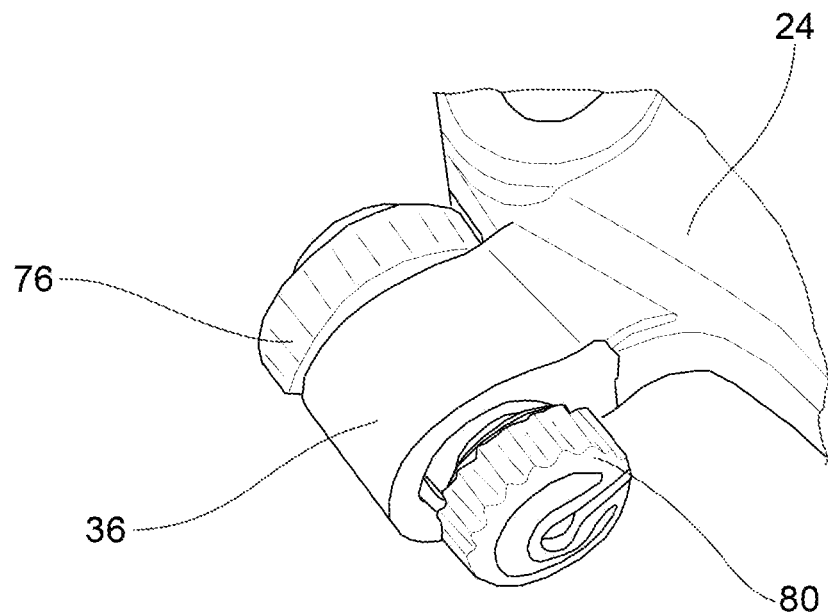
FIG. 4 is a perspective view of the actuation lever in FIG. 1, according to a different angle with respect to FIG. 1.
Figure 5:
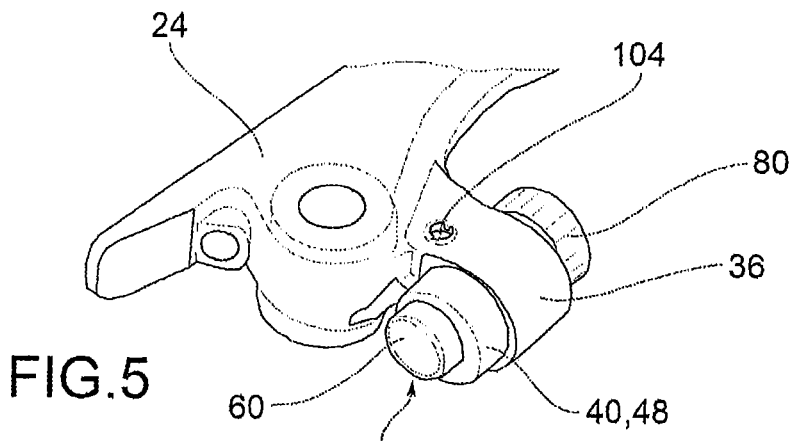
FIG. 5 is a perspective view, in assembled configuration, of an actuation lever of an actuator device according to an embodiment of the present invention.
Figures 6, 7:
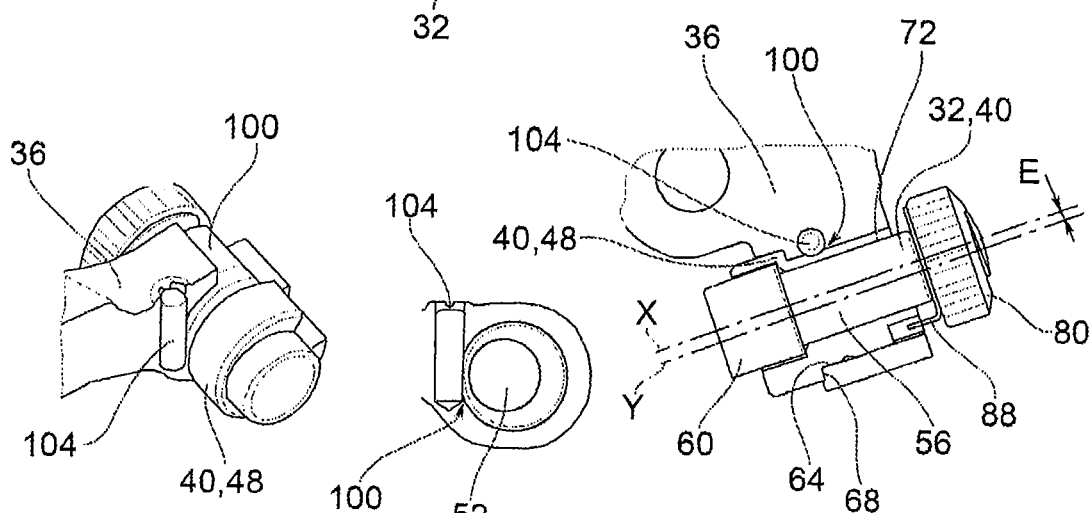
FIGS. 6-7 are perspective section views of the actuation lever in FIG. 5.
Figure 8:
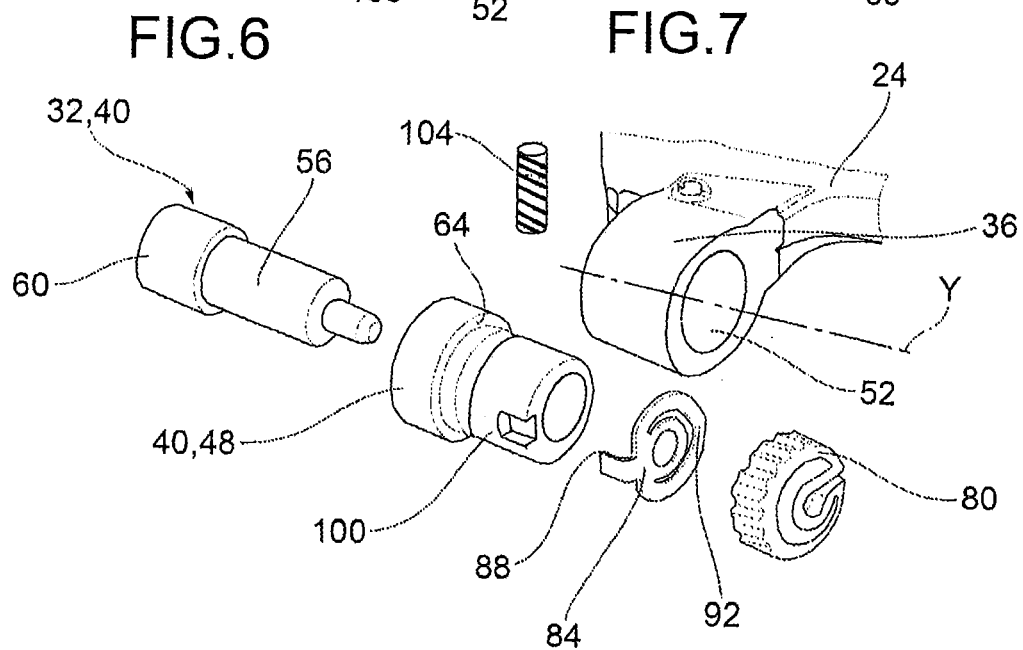
FIG. 8 is a perspective view, with parts separated, of the actuation lever in FIG. 5.
Figure 9:
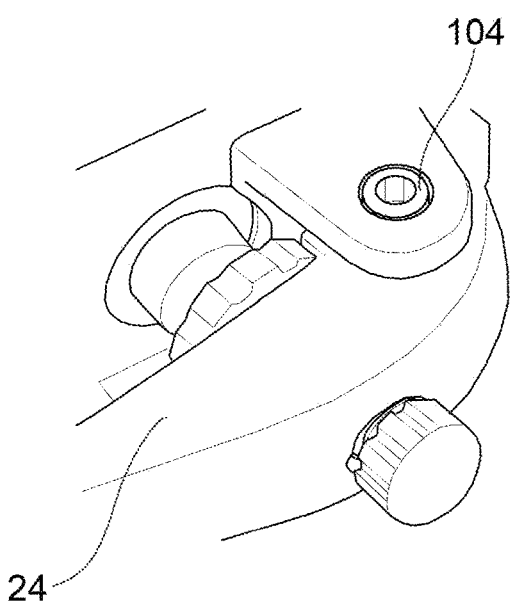
FIG. 9 is a perspective view of an actuation lever according to a further embodiment of the present invention.
Figure 10:
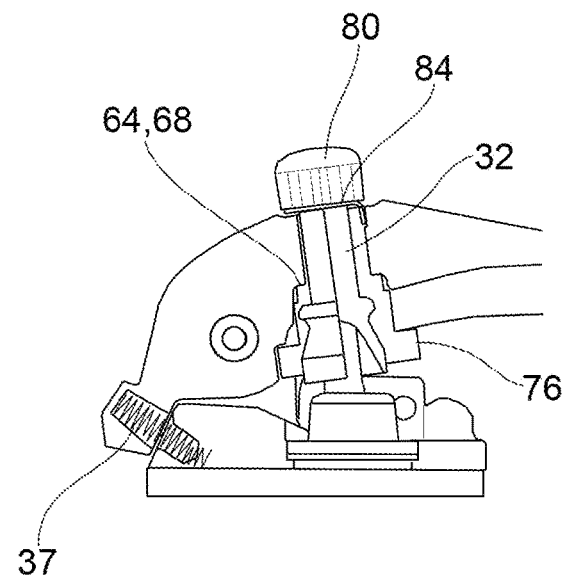
FIG. 10 is a section view of the actuation lever in FIG. 9.
Figure 11:
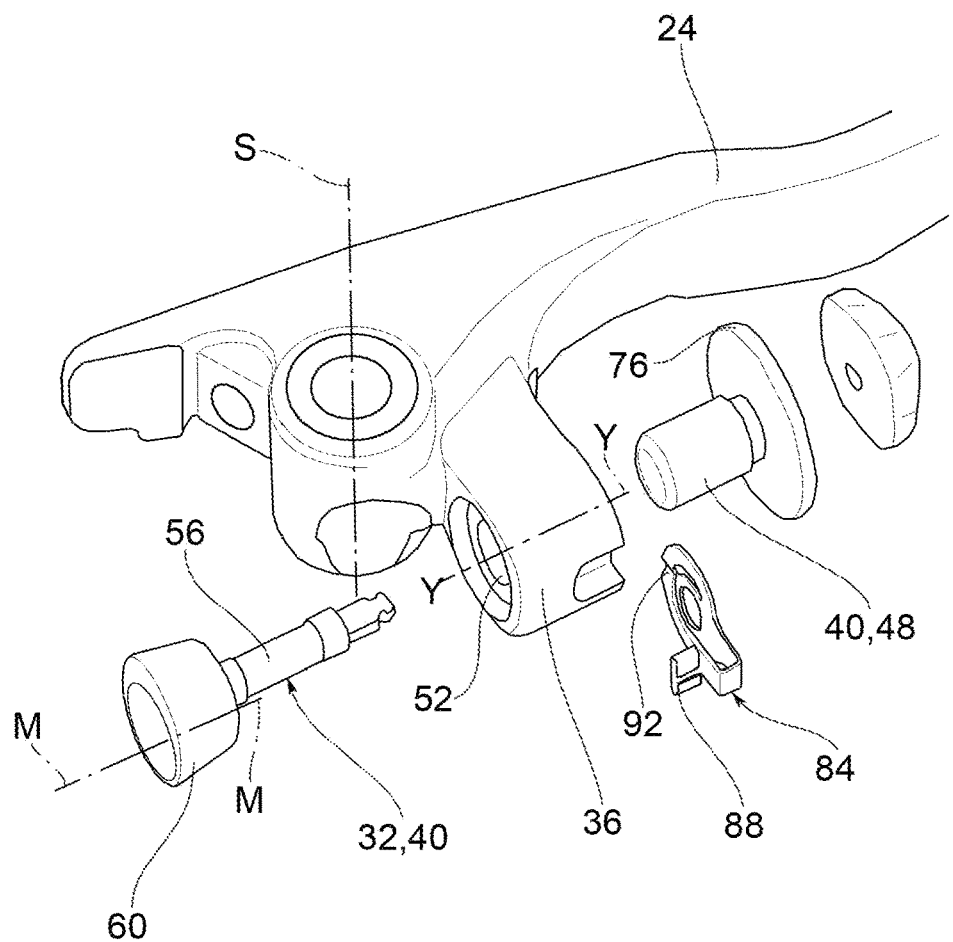
FIG. 11 is a perspective view with parts separated of an actuation lever for an actuation device according to an embodiment of the present invention.
Figure 12:
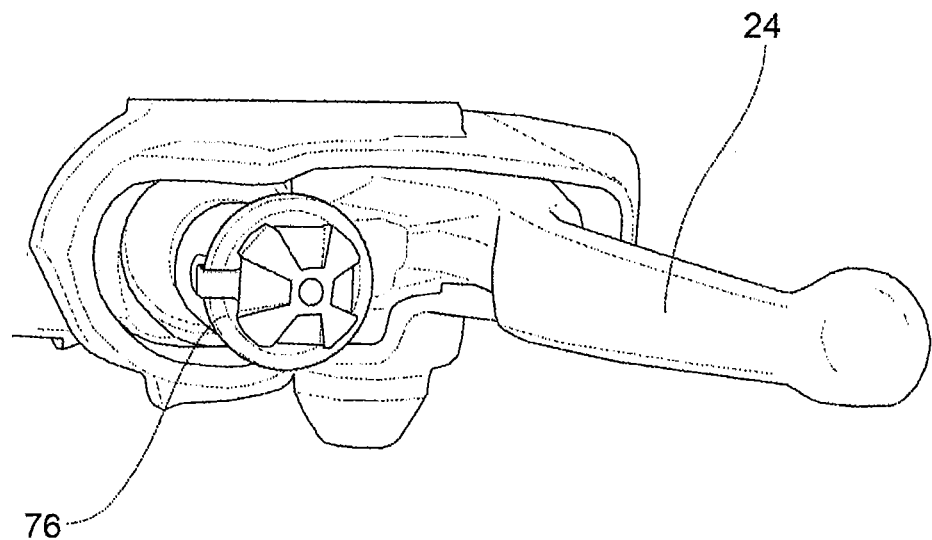
FIG. 12 is a perspective view of the actuation lever of the actuator device in FIG. 11 in assembled configuration.
Figure 13:
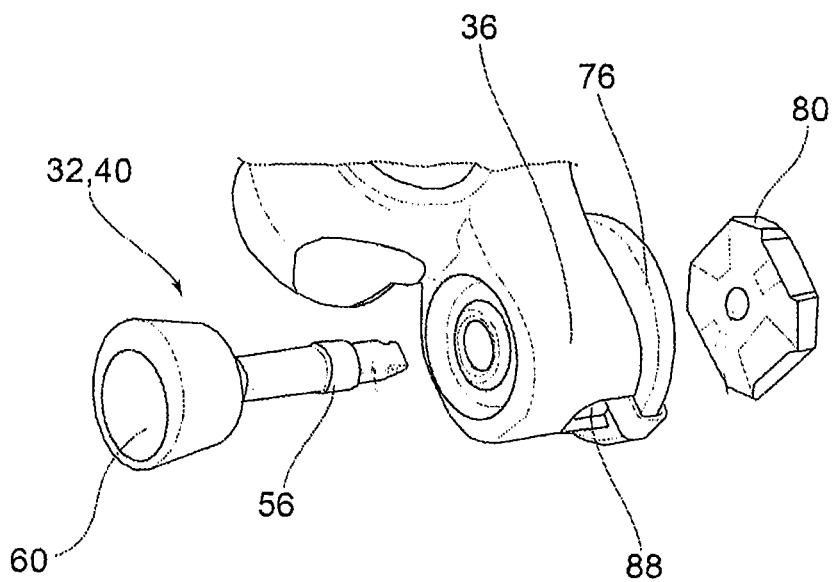
FIGS. 13-14 are perspective section views, with parts separated, of some components of the actuation lever in FIG. 11.
Figure 14:
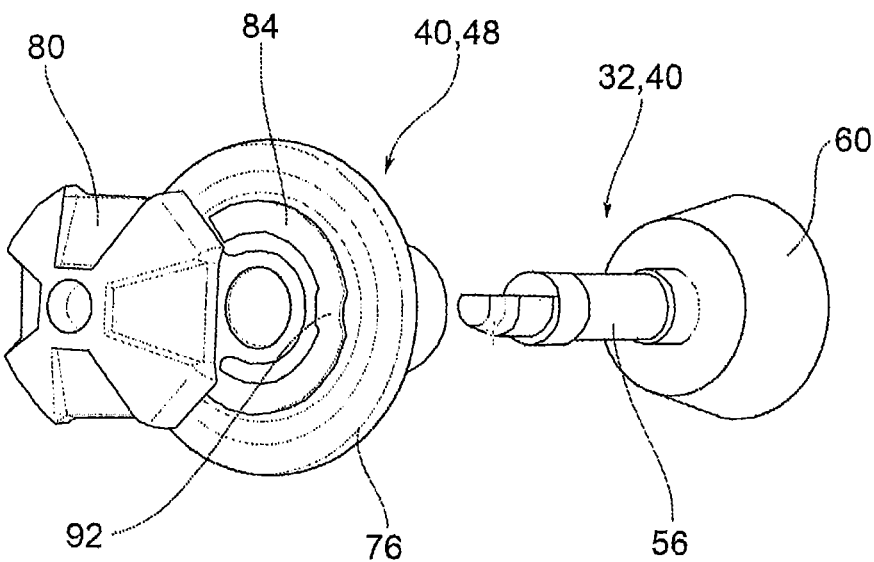

With reference to the aforementioned figures, an actuator device for a hydraulic actuation system of a brake/clutch of vehicles, in particular of motorcycles, is indicated by reference numeral 4 as a whole.

For the purposes of the present invention, vehicles are both cars and motorcycles.

Moreover, the actuator device 4 may be of any type and size, preferably adapted to be mounted on a handlebar of a motorcycle and to operate a hydraulically-operated brake and a clutch.

More in particular, the actuator device 4 for a hydraulic actuation system of a brake/clutch of a motorcycle comprises a support structure 8 associable with a handlebar 12 of a motorcycle.

For the purposes of the present invention, the type, size and materials of the support structure, which must be considered in the most general sense possible, are irrelevant.

The actuator device 4 further comprises an actuation assembly 16 having a push rod 20, operatively connectable to at least one braking device (not shown), and an actuation lever 24 connected to the support structure 8.

The push rod 20, in a known manner, comprises a thrust end 26 adapted to be pressed by the actuation lever 24 of the actuator device 4 and an inner end 28 operatively connectable to at least one braking device. The connection of the inner end 28 to at least one braking device can be of any type and is preferably a hydraulic connection but can also be mechanical.

Furthermore, it is also possible to connect the inner end 28 of the push rod 20 to an accumulator device adapted to simulate resistance offered by an operation of a braking device (e.g. in systems of the brake-by-wire type).

The actuator device 4 comprises actuation lever 24 which is rotationally connected to the support structure about an actuation axis S-S in a first and a second rotation direction, respectively towards and away from the associable handlebar.

The rotational connection of the actuation lever 24 to the support structure 8 firstly allows to apply a thrusting action against the push rod 20 to operate the brake or clutch. The actuation lever 24 is rotational towards and away from the handlebar 12, in order to allow the adjustment of the distance of the actuation lever 24 from the handlebar 12 itself: such an adjustment can be used by the user to adjust the rest position of the lever itself as a function of the principles of ergonomics or in any case to his or her preferences.

The actuation lever 24 is provided with a pusher 32 adapted to interface with said push rod 20.

Typically, the pusher 32 is housed/supported within an appropriate appendix 36 obtained on the actuation lever 24.

The actuator device is provided, in a known manner, with thrust means 37 which elastically bias the actuation lever 24 towards the handlebar 12 so as to promote the contact between the pusher 32 and the thrust end 26 of the push rod 20.

The actuator device 4 further comprises adjustment means 40 adapted to modify both the angular position, in a rest condition, of the pusher 32 and of the actuation lever 24 with respect to the handlebar and to modify a pitch 44 between the actuation axis S-S of the actuation lever 24 and a contact and thrust point P of the pusher 32 on said push rod 20.

The adjustment means 40 comprise a bushing 48 inserted in a counter-shaped cylindrical seat 52 of the actuation lever 24 having a symmetry axis Y-Y, so as to be able to at least rotate about said symmetry axis Y-Y.

The adjustment means 40 further comprise said pusher 32 having a tang 56, inserted inside the bushing 48, and a bowl 60, integral with the tang 56, which interfaces with the push rod 20.

In a known manner, the bowl 60 comprises a concave portion with a spherical cap shaped profile so as to be able to interface with the thrust end 26 of push rod 20, even modifying the relative inclination between pusher 32 and push rod 20.

Advantageously, said bowl 60 is offset with respect to the symmetry axis Y-Y by an eccentricity E, so as to be able to vary the pitch 44 by turning the bowl 60 about the symmetry axis Y-Y.

In other words, by virtue of the eccentricity E of the bowl 60 and the symmetry axis Y-Y, as a result of the rotation of the pusher 32, and thus of the bowl 60 about the symmetry axis Y-Y of the cylindrical seat 52, the arm, i.e. the pitch 44 between the contact point and thrust P, between the thrust end 26 of the push rod 20 and the bowl 60, and the actuation axis S-S is adjusted. Therefore, although the tang 56 and the bowl 60 aligned with each other, turning about the symmetry axis Y-Y is obtained by varying the pitch 44.

The modification of such as pitch E or arm allows, the actuation lever 24 being equal and even upon variation of the rest position of the actuation lever 24, to soften or stiffen the actuation lever itself.

In other words, increasing the pitch 44, and the force applied by the user being equal, increases the overall torque which is released onto the push rod 20, and vice versa.

Advantageously, the pusher 32 slides with respect to the actuation lever 24 parallel to said symmetry axis Y-Y. In other words, as better described below, it is possible to vary the axial position of the pusher 32, and therefore of the bowl 60, along the symmetry axis Y-Y so as to vary the angular position at rest of the actuation lever 24 with respect to said actuation axis S-S, i.e. so as to vary the distance at rest between the actuation lever 24 and the handlebar.

Advantageously, the translation and eccentric rotation movements of the pusher 32 with respect to the symmetry axis Y-Y are mechanically independent of each other. Thus, it is possible to perform the adjustments of the rest position of the actuation lever 24 and of the pitch 44 of the lever itself in a totally separate manner, without the modification of one of the two parameters (pitch 44, the rest position of the lever 24) may modify or in any case limit the range of adjustments of the other parameter (rest position of the lever 24, pitch 44).

This option allows the user to achieve a high level of customization of the actuation lever 24, both in terms of actuation sensitivity and in terms of distance from the handlebar 12.

According to a possible embodiment of the (FIGS. 1-10), the bushing 48 is fitted in the cylindrical seat so as to be able to rotate and not translate with respect to the seat along the symmetry axis Y-Y.

For this purpose, it is possible to provide on the bush 48 at least one shoulder 64 which abuts against a respective abutment 68 on the actuation lever 24.

The pusher 32 is inserted inside the bushing 48 according to a screw-nut coupling 72 with respect to an adjustment axis X-X placed parallel and eccentric with respect to the symmetry axis Y-Y, according to said eccentricity E.

Preferably, the tang 56 of the pusher 32 is misaligned by said eccentricity E with respect to the symmetry axis Y-Y.

According to a possible embodiment (FIGS. 1-4), the bushing 48 comprises an outer collar 76 to rotate it, so as to rotate the pusher eccentrically with respect to the symmetry axis Y-Y. As seen, the pitch 44 can thus be adjusted in a totally separate manner, i.e. without modifying the rest position of the actuation lever 24 in any manner.

Preferably said outer collar 76 is provided with knurls or a section having symmetry which is not a rotation solid in order to facilitate the grip and manual rotation by a user. For example, said outer collar 76 is arranged between appendix 36 and bowl 60.

For example, the tang 56 is integrally connected to a knob 80 for roto-translating it with respect to the bushing 48 along the adjustment axis X-X.

The connection between the tang 56 and the knob 80 can occur by means of a shape coupling, e.g. with a non-cylindrical peg which engages a corresponding complementarily shaped seat.

Both the outer collar 76 and the knob 80 can be provided with signs and graphic references regarding the type of adjustment that can allow. Obviously, it is also possible to provide corresponding graphic indications, references, alignments charts and the like at the appendix 36 of the actuation lever 24.

The roto-translation is due to the screw-nut screw coupling 76 between push rod 20 and bushing 48. For the purposes of obtainable adjustment, it is the overall translation of the push rod 20 with respect to the bushing 48 that counts because the rest position of the actuation lever 24 and its distance from the handlebars are changed by virtue of it.

A spring 84 is interposed between the pusher 32 and the actuation lever 24, having at least one locking end 88 fixed to the actuation lever 24 to adjust the rotation of the pusher 32 in steps.

Said spring 84 also implements a step-lock for the rotation of the bushing 48, by means of at least one tooth 92 which engages between the knob 80 and a portion of a body or plate 96 of the spring 84.

Therefore, the spring 84 itself does not rotate and acts as a fixed reference for both adjustments, i.e. for the adjustment of the pitch 44 and for the adjustment of the rest position of the actuation lever 24.

Figure 19:
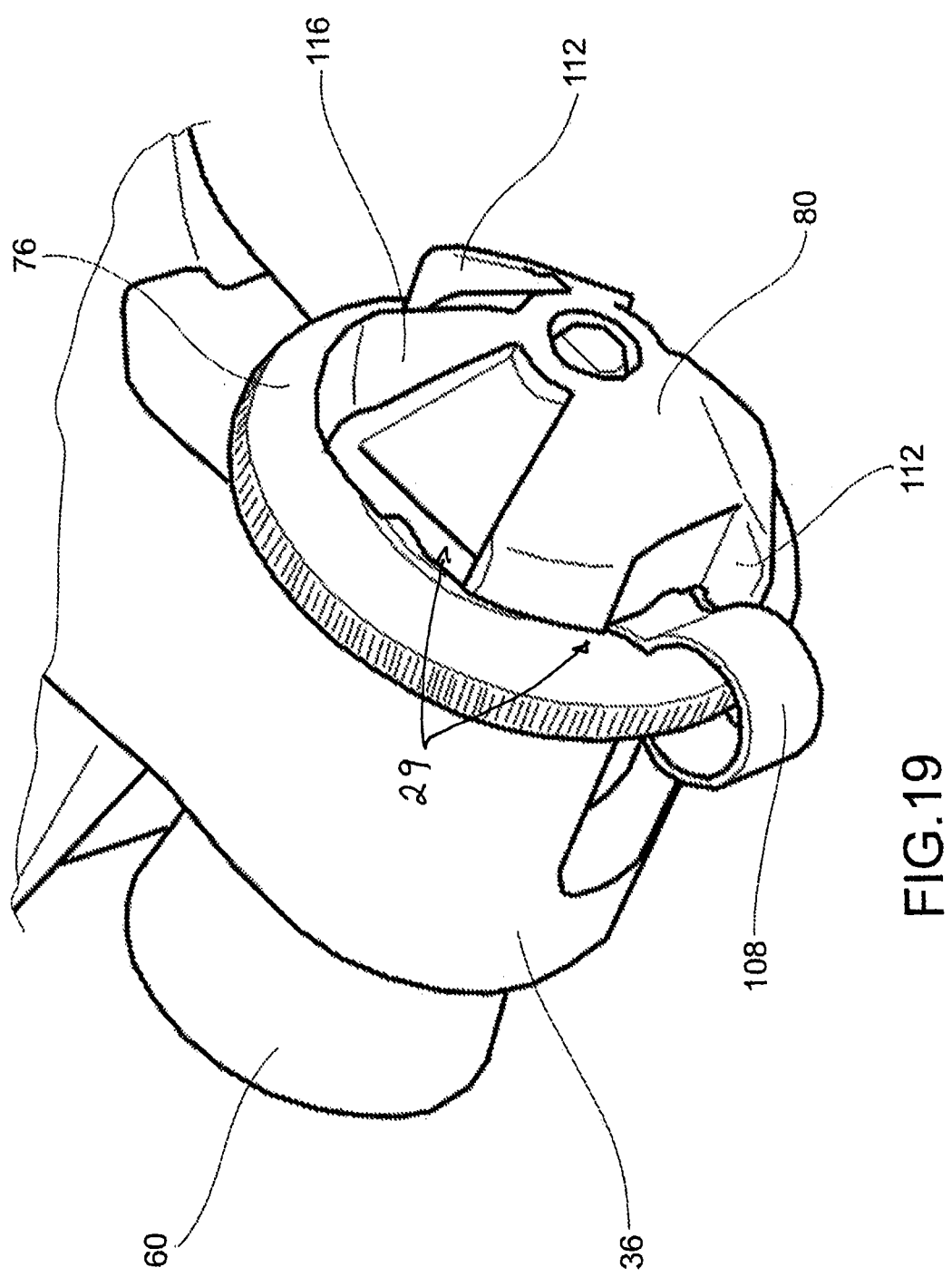
FIGS. 19-21 are respectively a perspective view, a plan view and a side view of a detail of a variant of the embodiment in FIG. 11.
Figure 20:
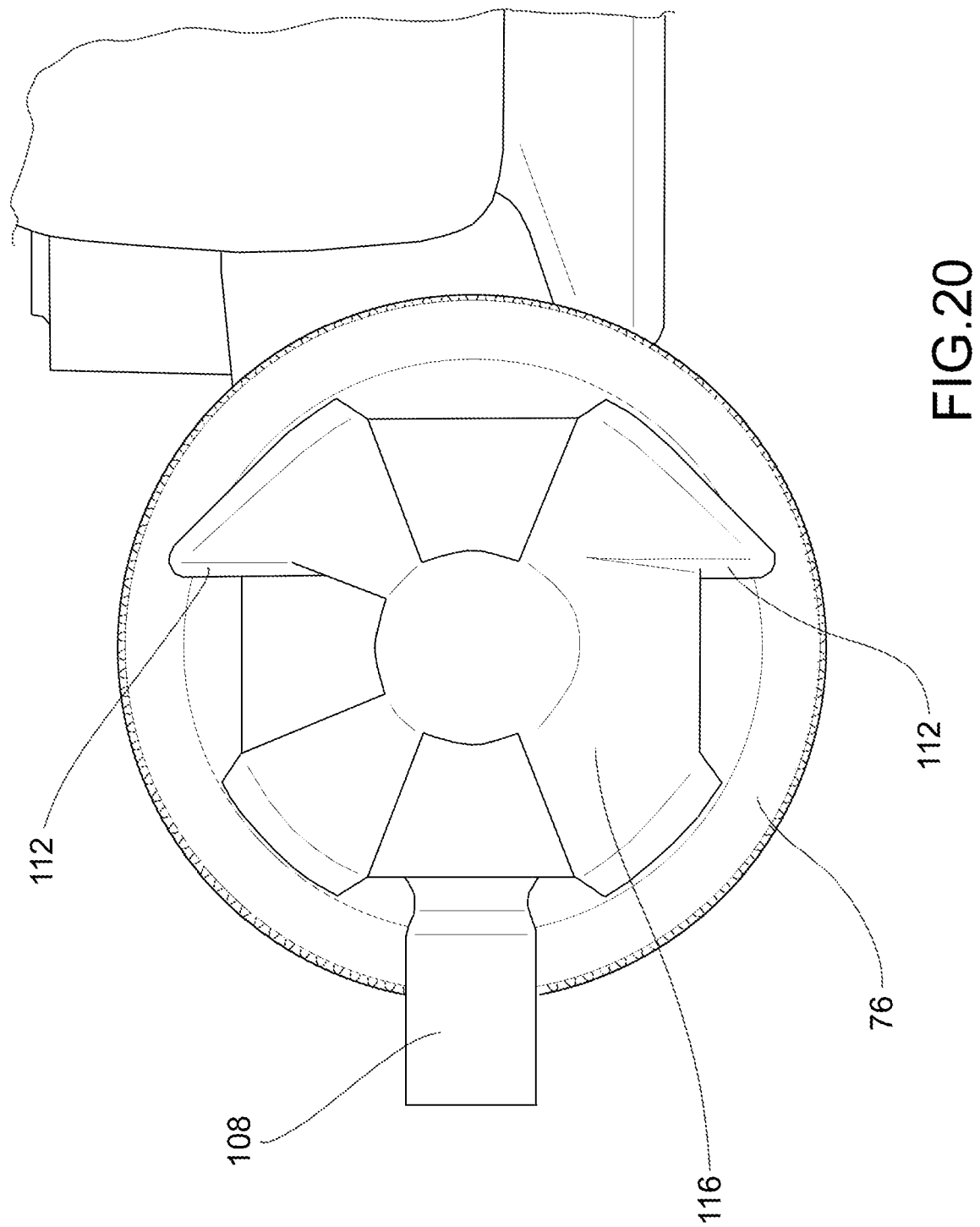
Figure 21:
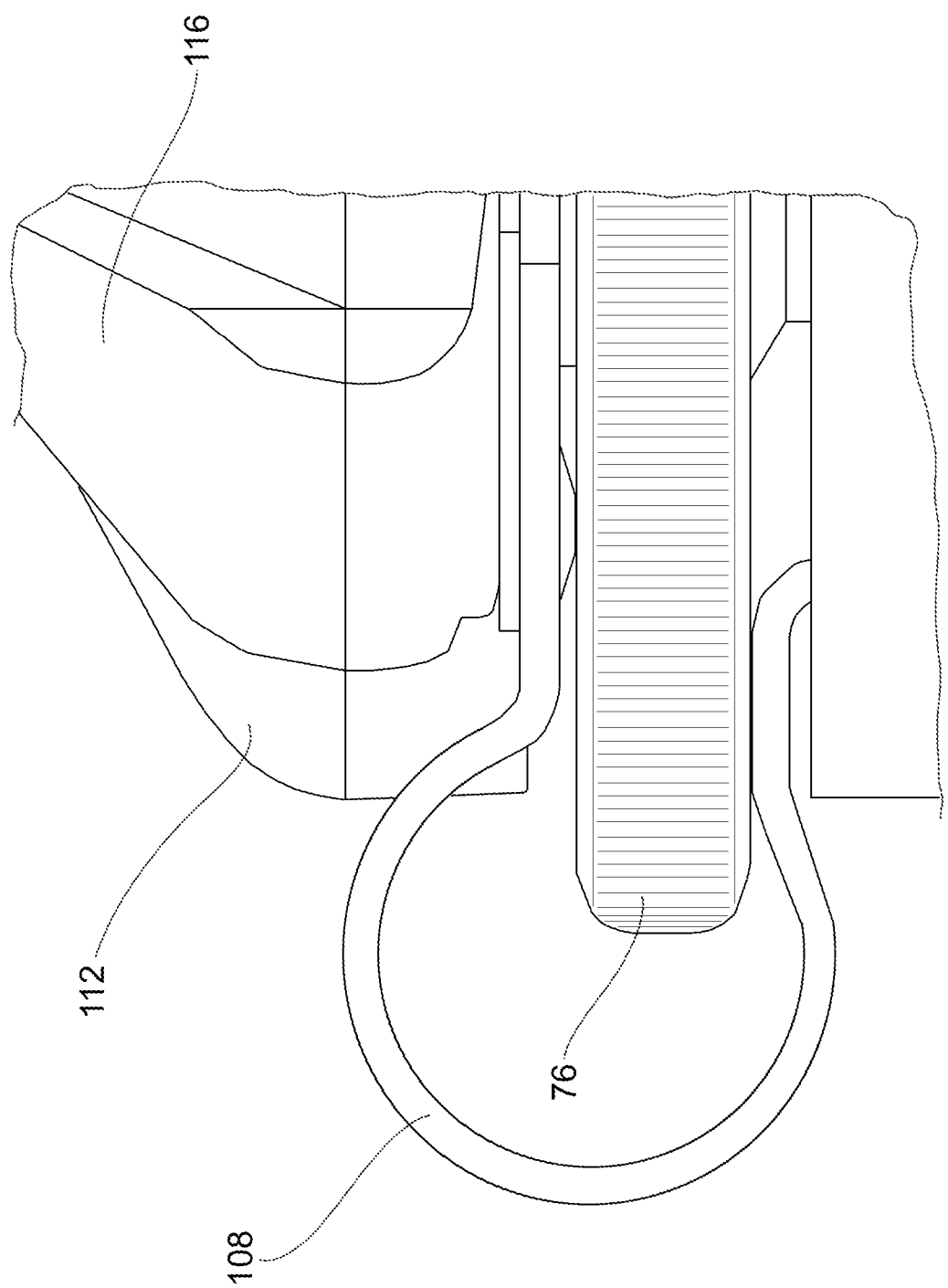

According to a possible embodiment (FIGS. 19-21), said spring 84 and/or said knob 80 are configured so as to provide at least one limit stop 29 of the rotation of the pusher 32, so as to achieve a limit stop abutment between the spring 84 and knob 80 upon reaching a predetermined position of the adjustment of the pitch 44. Typically, the predetermined position is in an end of adjustment position, i.e. in a maximum or minimum distance position 44.

Preferably, said spring 84 and/or said knob 80 are configured so as to provide two limit stops of the rotation of the pusher 32, in mutually opposite directions, so as to achieve a limit stop abutment between the spring 84 and knob 80 to reach two respective predefined maximum and minimum pitch 44 positions.

For example, the spring 84 comprises a folded portion 108 about the outer collar 76 rigidly coupled to the bushing 48; the folded portion 108 performs at least one limit stop abutment against a corresponding shoulder 112 formed on the knob 80.

The knob 80 comprises an inner gripping portion 116 which can rotate without interfering with said folded portion 108 of the spring 84 and at least one shoulder 112 which protrudes from said inner gripping portion 116 so as to interfere with the folded portion 108 of the spring 84 when reaching a limit stop.

This embodiment adds a function of locking of the center-to-center adjustment in the lowest and highest position. Such a function improves the legibility of the change of pitch 44, whereby univocally defining the limits: therefore, the passage is from a continuous type adjustment which goes from maximum to minimum and back from minimum to maximum as one continues to turn, to an adjustment which ensures the achievement of the extremes of adjustment at the opposite limit ends. This function is achieved by obtaining a rotation block through the shoulder 112 or protrusion on the knob 80 which allows the adjustment of the pitch 44: in limit position, the shoulder 112 interferes with the spring 84, i.e. with the folded portion 108, not allowing the further rotation. In this embodiment, the spring 84, already employed to provide the snap lock for adjustment of the pitch 44 and distance lever, also assumes the function of a stop of the adjustment of the pitch 44 in the limit positions. Therefore, the adjustment of the pitch 44, by virtue of the presence of the limit stop, is easier and more intuitive.

According to a possible embodiment (FIGS. 5-10), the bushing 48 comprises an outer threaded surface 100 which meshes with an adjustment screw 104, associated with the actuation lever 24, to allow the rotation the bushing 48.

Preferably, the meshing between the outer threaded surface 100 of the bushing 48 and the adjustment screw 104 is of the irreversible type.

The adjusting screw 104 may be operated from outside the actuation lever 24 by inserting a screwdriver, a hex key or the like, which is inserted in a hole on the actuation lever 24, which allows access to a head of said adjustment screw 104.

Preferably, a spring 84 is interposed between the pusher 32 and the lever 24 or bushing 48, having at least one locking end 88 fixed to the lever 24 or bushing 48 to adjust the rotation of the pusher 32 in steps and thus to adjust the pitch 44. The spring 84 itself is provided with a tooth 92 which mates with the knob 80.

In this case, there is no need for the spring 84 to implement also the locking of the adjustment of the axial position of pusher 32 because such a fixing is ensured by the irreversibility of the meshing between the threaded outer surface 100 of the bushing 48 and the adjusting screw 104.

In this case, the spring 84 does not rotate and acts as a fixed reference for adjusting the pitch 44.

According to an embodiment (FIG. 11-18), the bushing 48 is inserted in the cylindrical seat 52 by means of a screw-nut type coupling centered according to the symmetry axis Y-Y so as to roto-translate parallel to said symmetry axis Y-Y.

Advantageously, the pusher 32 and the bushing are rotatably free and axially bound to each other with respect to said symmetry axis (Y-Y).

Preferably, the tang 56 of the pusher 32 is coaxial with said symmetry axis Y-Y and the bowl 60 has a centerline axis M-M off-center with respect to the symmetry axis Y-Y by said eccentricity E.

Said centerline M-M and the symmetry axis Y-Y are mutually parallel and spaced apart.

Therefore, the tang 56 and the bowl 60 are not mutually aligned and by rotating the tang about the symmetry axis Y-Y, by virtue of the knob 80, one obtains the variation of the pitch 44.

Figure 15:
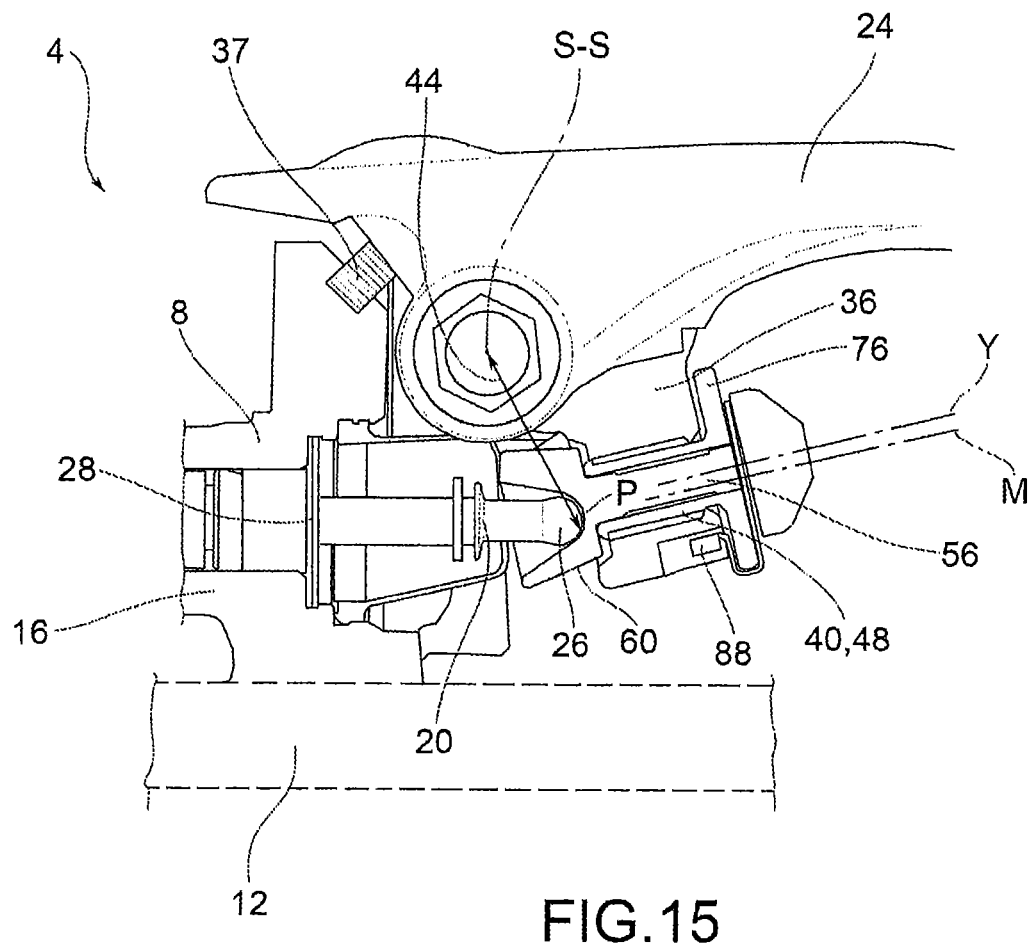
FIGS. 15-16 show perspective, partial section views of an actuator device comprising the actuation lever in FIG. 11 in two different steps of the pitch adjustment, without varying the distance of the actuation lever from the handlebar.
Figure 16:
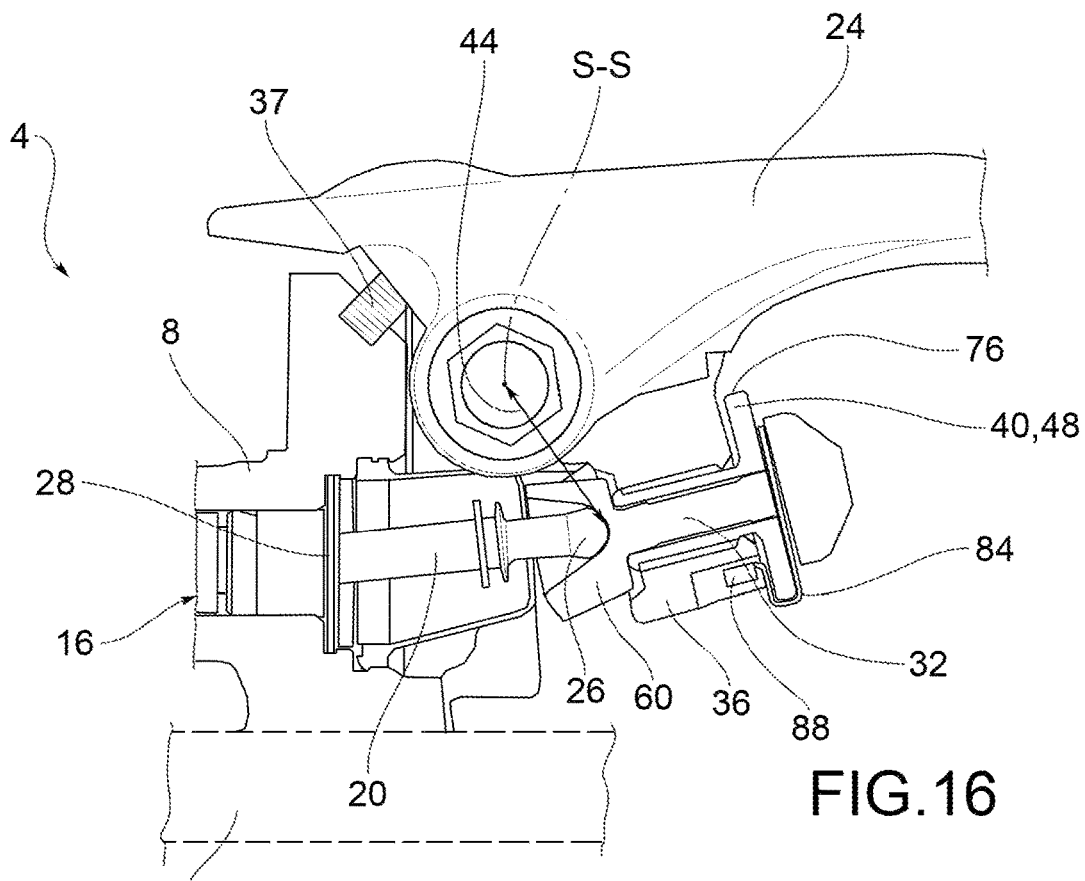

For example, FIGS. 15-16 show two opposite adjustments of the pitch, respectively a 'rigid' adjustment (FIG. 15) and a soft setting (FIG. 16). As can be seen to vary such an adjustment does not change the rest position of the actuation lever 24.

Figure 17:
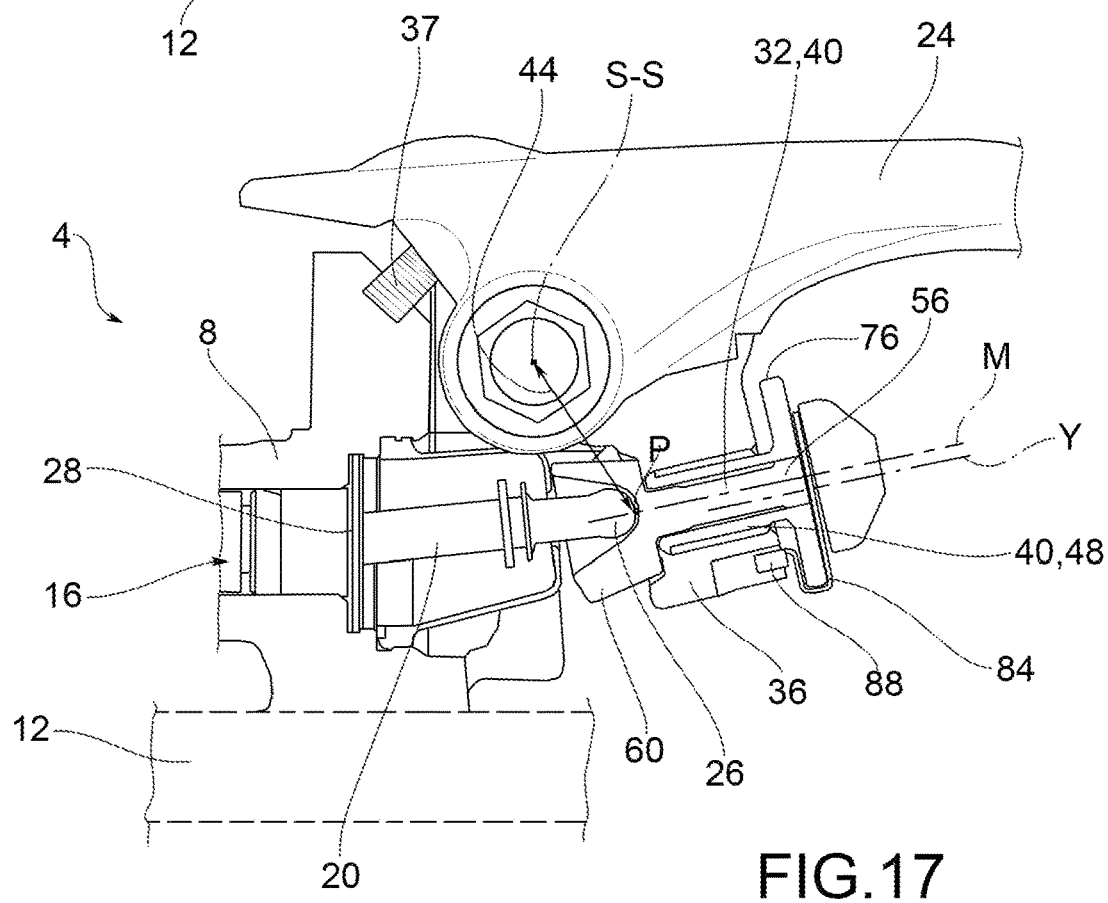
FIGS. 17-18 show perspective, partial section views of an actuator device comprising the actuation lever in FIG. 11 in two different steps of the lever distance adjustment without varying the pitch.
Figure 18:
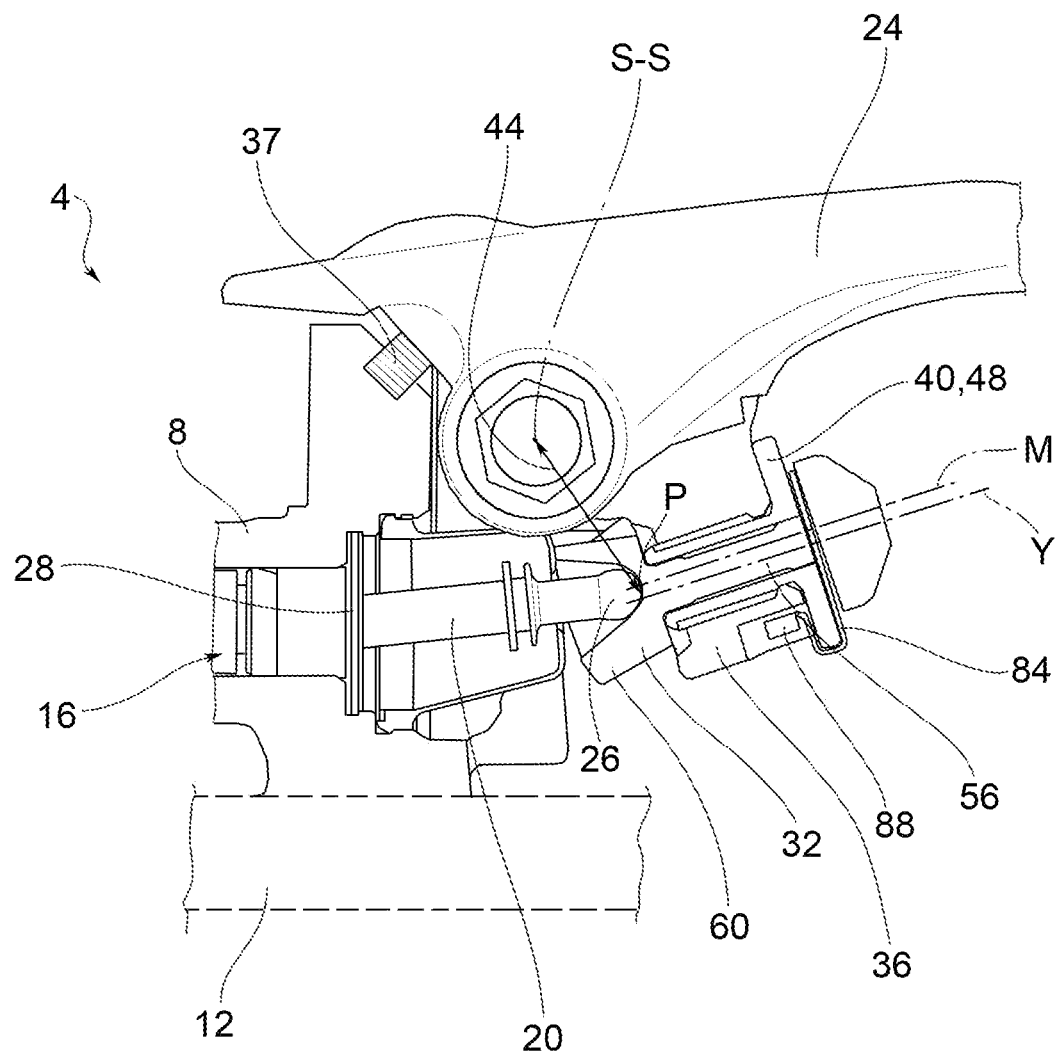

FIGS. 17-18 represent two opposite adjustments of the rest position of the actuation lever 24, respectively an adjustment of minimum distance from the handlebar 12 (FIG. 17) and an adjustment of maximum distance from the handlebar 12 (FIG. 18). As can be seen, varying such an adjustment does not change the pitch 44.

According to an embodiment, the tang 56 is integrally connected to a knob 80 for roto-translating it with respect to the bushing 48 along the adjustment axis.

The bushing 48 is, in turn, provided with an outer collar 76 for manual rotation thereof by a user.

Preferably, a spring 84 is interposed between the pusher 32 and the actuation lever 24, having at least one locking end 88 fixed to the actuation lever 24 to adjust the rotation of the pusher 32 in steps.

Preferably, said spring 84 also implements a step-lock for the rotation of the bushing 48, by means of at least one tooth 92 which engages between the knob 80 and a portion of a body or plate 96 of the spring 84. The spring 84 does not rotate and acts as a fixed reference for both adjustments, i.e. for the adjustment of the pitch 44 and for the adjustment of the rest position of the actuation lever 24.

Preferably, in the embodiment in FIGS. 11-18, both the outer collar 76 and the knob 80 are arranged on the same side with respect to the pusher 32, e.g. on the opposite side of the bowl 60.

Therefore, the outer collar 76 and the knob 80 are close to each other and can be easily operated by the user, also during a race.

As can be appreciated from the description above, the present invention allows to overcome the drawbacks raised in the prior art.

In particular, the present invention provides a device which is simple, robust, intuitive to use and innovative; said device allows to adapt the driver's adjustment in an intuitive and fast manner, without renouncing the possibility to perform the adjustment of the rest position of the lever and the pitch of the lever itself in a separate manner.

Indeed, the independence of these two adjustments is an important advantage with respect to the solutions of the prior art.

Furthermore, these objects are achieved by a device consisting of a limited number of components, which therefore reduces the production and assembly costs.

Moreover, the device can be applied to pre-existing solutions as a 'retrofit'.

Moreover, the coaxial adjustment allows the adjustment of the pitch and the distance close each other and easily identifiable, but also, at the same time, separate.

Therefore, by virtue of the present invention, integrate and approach the two controls to adjust the distance and the pitch of the lever, simplifying both operation and the indications on the control of the variation of the distance and of the pitch.

The adjustment of the pitch is intuitive in use (Hard-Soft) and preferably has 8 total positions.

There are fewer components with respect to the normal known adjustment systems with cost savings even on suppliers of components: indeed, a single component is added with respect to standard adjustable levers series without pitch adjustment.

The system is easy to install in line, even on existing products, without needing to make changes to the products themselves or to the lines.

The system is versatile and can be applied to all levers which do not provide direct operation of the microswitch (PR, PS, Offroad, etc.).

Those skilled in art can make several changes and variations to the braking systems and methods of actuating the braking systems for vehicles described above, all contained within the scope of the invention defined by the following claims, in order to meet contingent, specific needs.

The invention claimed is:

1. An actuator device for a hydraulic actuation system of a brake/clutch of a motorcycle, comprising:
a support structure associable with a handlebar of the motorcycle,
an actuation assembly having a push rod, operatively connectable to at least one braking device,
an actuation lever rotationally connected to the support structure about an actuation axis in a first and a second direction towards and away from the associable handlebar, equipped with a pusher adapted to interface with said push rod,
an adjustment device adapted to modify both an angular position, in a rest condition, of the pusher and of the actuation lever with respect to the handlebar and to modify a pitch between the actuation axis of the actuation lever and a contact and thrust point of the pusher on said push rod,
wherein the adjustment device comprises a bushing inserted in a cylindrical seat of the actuation lever having a symmetry axis, so as to be able to at least rotate about said symmetry axis,
the adjustment device comprises said pusher having a tang, inserted inside the bushing, and a bowl, integral with the tang, which interfaces with the push rod, said bowl being misaligned with respect the symmetry axis by an eccentricity, so as to be able to vary the pitch by rotating the bowl about the symmetry axis,
wherein the pusher slides with respect to the actuation lever parallel to said symmetry axis,
wherein translation and eccentric rotation movements of the pusher with respect to the symmetry axis are mechanically independent of each other;
wherein the bushing is fitted in the cylindrical seat so as to be able to rotate and not translate with respect to the cylindrical seat along the symmetry axis.

2. The actuator device according to claim 1, wherein the pusher is inserted inside the bushing with a screw-nut coupling with respect to an adjustment axis placed parallel and eccentric with respect to the symmetry axis.

3. The actuator device according to claim 1, wherein the tang of the pusher is misaligned by said eccentricity with respect to the symmetry axis.

4. The actuator device according to claim 1, wherein the bushing comprises an outer collar to allow for rotation of the bushing, so as to rotate the pusher eccentrically with respect to the symmetry axis.

5. The actuator device according to claim 1, wherein the tang is connected to a knob for roto-translating the tang with respect to the bushing along the adjustment axis.

6. The actuator device according to claim 5, wherein a spring is interposed between the pusher and the actuation lever, having at least one locking end fixed to the actuation lever to adjust the rotation of the pusher in steps.

7. The actuator device according to claim 6, wherein said spring also implements a step-lock for the rotation of the bushing, via at least one tooth which engages between the knob and a portion of a body or plate of the spring.

8. The actuator device according to claim 7, wherein said spring and/or said knob are configured to provide at least one limit stop of the rotation of the pusher, so as to achieve a limit stop abutment between the spring and knob upon reaching a predetermined position of the adjustment of the pitch.

9. The actuator device according to claim 8, wherein said knob is configured to provide two limit stops of the rotation of the pusher, in mutually opposite directions, so as to achieve a limit stop abutment between the spring and knob to reach two respective predefined maximum and minimum pitch positions.

10. The actuator device according to claim 7, wherein said spring comprises a folded portion about an outer collar integral with the bushing, said folded portion obtaining at least one limit stop abutment against a corresponding shoulder formed on the knob.

11. The actuator device according to claim 10, wherein the knob comprises an inner gripping portion which can rotate without interfering with said folded portion of the spring and at least one shoulder which protrudes from said inner gripping portion so as to interfere with the folded portion of the spring when reaching a limit stop.

12. The actuator device according to claim 1, wherein the bushing comprises an outer threaded surface which meshes with an adjustment screw, located in the actuation lever, to allow the rotation the bushing.

13. The actuator device according to claim 12, wherein the meshing between the outer threaded surface of the bushing and the adjustment screw is of the irreversible type.

14. The actuator device according to claim 13, wherein a spring is interposed between the pusher and the actuation lever or bushing, having at least one locking end fixed to the actuation lever or bushing to adjust the rotation of the pusher in steps.

15. The actuator device according to claim 1, wherein the bushing is inserted in the cylindrical seat via a screw-nut type coupling centered along the symmetry axis so as to roto-translate parallel to said symmetry axis,
wherein the pusher and the bushing are rotatably free and axially bound to each other with respect to said symmetry axis.

16. The actuator device according to claim 15, wherein the tang of the pusher is coaxial with said symmetry axis and the bowl has a centerline axis off-center with respect to the symmetry axis by said eccentricity.

17. The actuator device according to 16, wherein the tang is connected to a knob for the roto-translation of the tang to the bushing along the symmetry axis.

18. The actuator device according to claim 15, wherein a spring is interposed between the pusher and the actuation lever, having at least one locking end fixed to the actuation lever to adjust the rotation of the pusher in steps.

19. The actuator device according to claim 18, wherein said spring also implements a step-lock for the rotation of the bushing, via at least one tooth which engages between the knob and a portion of a body or plate of the spring.

* * * * *